April 5, 1966   S. C. SABO ETAL   3,244,575
TIRE BUILDING APPARATUS
Filed July 30, 1962   12 Sheets-Sheet 1

INVENTORS
STEPHEN C. SABO AND
JOHN L. REHMAN
BY
Teare, Tetzer & Teare
ATTORNEYS

April 5, 1966  S. C. SABO ETAL  3,244,575
TIRE BUILDING APPARATUS

Filed July 30, 1962  12 Sheets-Sheet 2

Fig. 2

INVENTORS
STEPHEN C. SABO AND
JOHN L. REHMAN
BY
Teare, Fetzer & Teare
ATTORNEYS

Fig. 3

April 5, 1966   S. C. SABO ETAL   3,244,575
TIRE BUILDING APPARATUS
Filed July 30, 1962   12 Sheets-Sheet 4

INVENTORS
STEPHEN C. SABO AND
JOHN L. REHMAN
BY
Teare, Tefzer & Teare
ATTORNEYS

April 5, 1966   S. C. SABO ETAL   3,244,575
TIRE BUILDING APPARATUS
Filed July 30, 1962   12 Sheets-Sheet 5

Fig. 6

INVENTORS
STEPHEN C. SABO AND
JOHN L. REHMAN
BY
Teare, Fetzer & Teare
ATTORNEYS

Fig. 8

INVENTORS
STEPHEN C. SABO AND
JOHN L. REHMAN

April 5, 1966 S. C. SABO ETAL 3,244,575
TIRE BUILDING APPARATUS
Filed July 30, 1962 12 Sheets-Sheet 8

INVENTORS
STEPHEN C. SABO AND
JOHN L. REHMAN
BY
Teare, Fetzer & Teare
ATTORNEYS

INVENTORS
STEPHEN C. SABO AND
JOHN L. REHMAN
BY
Teare, Tetzer & Teare
ATTORNEYS

United States Patent Office 3,244,575
Patented Apr. 5, 1966

3,244,575
TIRE BUILDING APPARATUS
Stephen C. Sabo and John L. Rehman, Barberton, Ohio, assignors to The Akron Standard Mold Company, Akron, Ohio, a corporation of Ohio
Filed July 30, 1962, Ser. No. 213,498
5 Claims. (Cl. 156—401)

This invention relates to a method and apparatus for building vehicle tires and particularly to a tire building apparatus which incorporates a rotatable drum upon which rubberized fabric plies, inextensible bead portions and tire tread portions are assembled for building vehicle tires.

In conventional tire building practice, two or more plies of rubberized fabric or the like are wound onto a rotating drum type apparatus. A pair of spaced inextensible circular bead rings are then placed over the plies adjacent the marginal edges of the drum, whereupon, the edges of the fabric plies are then turned up around the bead rings and stitched in place. The tire tread and chafing strips may then be stitched into place to form the completed tire carcass which then may be removed from the rotatable drum and vulcanized in the normal manner to provide a vehicle tire.

The incorporation of the inextensible bead rings with the fabric plies provides several important functions, especially when fabricating heavy duty tires, such as those for trucks, buses, and the like. The inextensible bead rings act to firmly secure the tire to the peripheral surface of the rim upon which the tire is to be applied and acts to exert a retaining pressure on the several fabric plies to prevent separation thereof, when the tire is subjected to harsh and extended useage. Moreover, the inextensible bead rings must be precisely positioned on the fabric plies and the fabric plies in turn must be smoothly and uniformly turned-up over the bead rings and stitched into retaining relationship therewith. Accordingly, if any sleaziness or distortion occurs when incorporating the bead rings to the fabric plies, there results a condition wherein the bead rings tend to move or shift out of alignment during the vulcanization or during the subsequent useage of the tire, thereby causing a hazardous roading condition when applied to a vehicle.

Additionally, the presence of sleaziness or wrinkles in the fabric plies or in the tire tread after vulcanization, results in a weakening of the fibers comprising the plies thereby causing premature failure of the tire when subjected to normal useage.

Therefore, a principal object of the present invention is to provide a novel automatic tire building apparatus and method wherein a single operator, working independently, may quickly and efficiently build vehicle tires having uniform structural characteristics.

Another object of the present invention is to provide a novel automatic tire building apparatus and method for building vehicle tires which has greater flexibility of operation, and which reduces manual labor and effort of operation.

Another object of the present invention is to provide a novel tire building apparatus, of the aforementioned type, which includes an expansible drum adapted to mount a plurality of fabric plies and which includes a novel bead setting mechanism for automatically and precisely positioning inextensible bead rings adjacent the ends of the expansible drum.

A further object of the present invention is to provide a novel tire building apparatus, of the aforementioned type, which includes a novel expansible diaphragm means for automatically and uniformly turning the lateral edges of the fabric plies around the inextensible bead rings.

Another object of the present invention is to provide a novel tire building apparatus, of the aforementioned type, which includes a novel diaphragm displacement mechanism for automatically and uniformly displacing said expansible diaphragm means for uniformly turning the lateral edges of the fabric plies around the inextensible bead rings.

A still further object of the present invention is to provide a novel tire building apparatus, of the aforementioned type, which includes a novel stitcher mechanism which will automatically and uniformly stitch the fabric plies about the inextensible bead rings and which will automatically and uniformly stitch the tire tread against the fabric plies without wrinkles or uneven surfaces resulting therefrom.

Other objects and advantages of the present invention will be apparent from the following description taken in conjunction with the accompanying drawings, wherein:

FIGS. 18, 18A, 19 and 20 are schematic illustrations of an electric control system for operating the novel tire building apparatus of the present invention, wherein FIG. 18A is a continuation of the schematic of FIG. 18, having been divided along line A—A.

GENERAL

Figure 1:
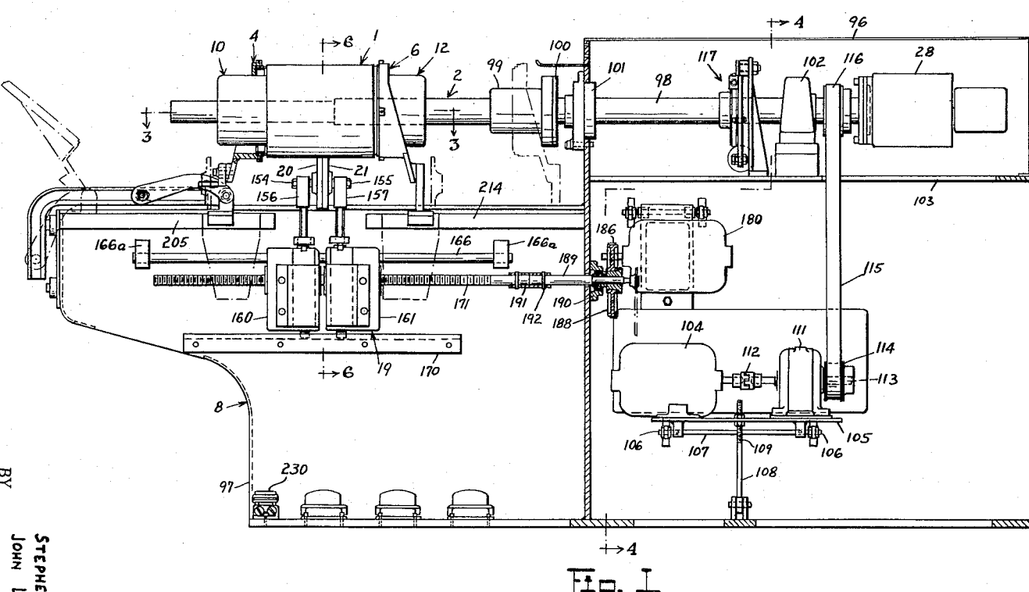
FIG. 1 is an elevational view, with parts broken away, of the novel tire building apparatus of the present invention preparatory to the application of the fabric plies to the rotatable drum.
Figure 2:
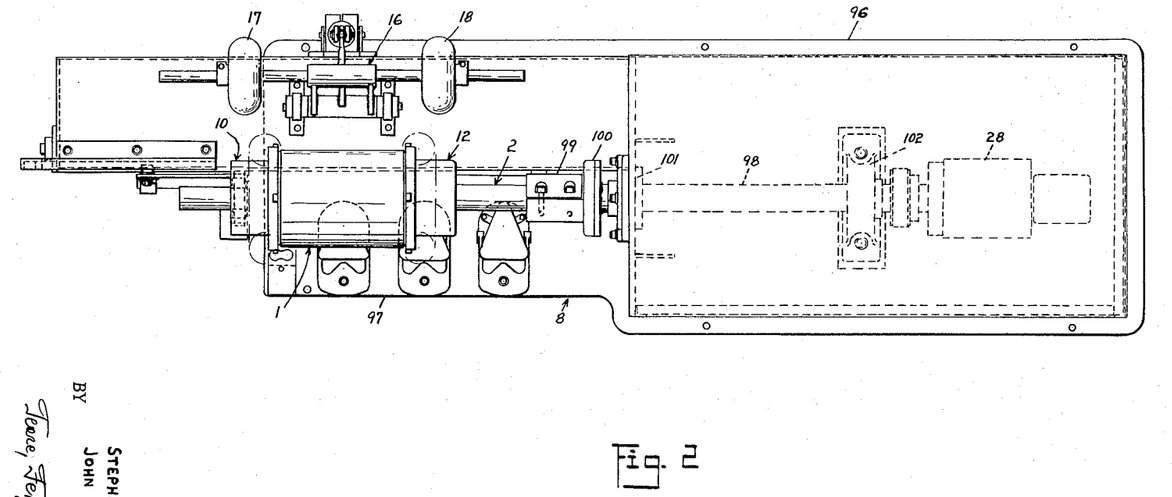
FIG. 2 is a top plan view, with parts removed, of the novel tire building apparatus of the present invention, and diaphragm displacement mechanism mounted on the housing and rearwardly of the rotatable drum.
Figure 3:
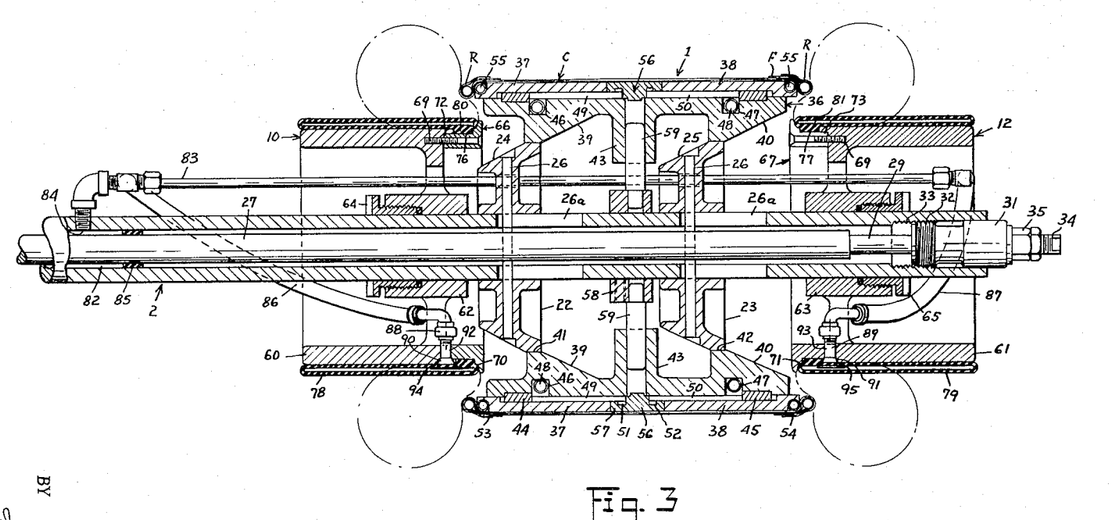
FIG. 3 is an enlarged cross-sectional view taken along line 3—3 of FIG. 1, and showing the rotatable drum and the expansible diaphragm means adjacent the ends thereof removed from the assembly.

Referring to FIGS. 1 to 3 of the drawings, the present invention, broadly described, comprises a radially expandable drum 1 rotatably mounted on a power quill 2 and adapted to support a tire carcass C of rubberized fabric plies F. A pair of bead setting units 4 and 6 may be slidably mounted on the tire building housing 8 and may be concentrically disposed adjacent each end of the drum 1, for axial movement toward and away from one another relative to the power quill 2 for positioning a pair of bead rings R over the tire carcass C. The power quill is shown mounting a pair of concentrically disposed expansible diaphragm units 10 and 12 which are supported adjacent each end of the drum for turning the lateral edges of the fabric plies F around the bead rings R of the tire carcass. As viewed in FIG. 2, a diaphragm displacement unit 16 including a pair of spaced diaphragm turnover wheels 17 and 18 may be mounted rearwardly of the drum 1 and pivotally connected to the tire building housing 8 for radial movement into and out of engagement relative to the respective expansible diaphragm units 10 and 12, to thereby complete, in a predetermined manner, turning of the lateral edges of the fabric plies F around the bead rings R. A stitcher unit 19, including a pair of oppositely disposed stitcher wheels 20 and 21 may be disposed beneath and forwardly of the drum 1 on the tire building drum 8. The stitcher wheels may be mounted for vertical movement into and out of engagement with the fabric plies F formed on the drum, and are axially movable toward and away from one another for uniformly stitching the fabric plies against the tire carcass upon completion of the ply turnover operation.

Generally, in utilizing the novel tire building apparatus, of the present invention, a plurality of fabric plies F comprising the tire carcass C may be sequentially applied to the rotating drum 1 from a conventional ply servicer (not shown). The drum may then be radially expanded to provide a tire carcas of the desired diameter. The bead setting units 4 and 6 may then be moved axially inwardly from an inoperative position (broken lines) to place a pair of inextensible bead rings R over the fabric plies F supported on the outer periphery of the tire building drum 1. Having provided the bead rings R, the bead setting units 4 and 6 may then be withdrawn and the expansible diaphragm units actuated, in a predetermined manner, for turning the lateral edges of the fabric plies F around respective bead rings R. In timed sequence, the diaphragm displacement unit 16 may then be radially pivoted into displacing engagement against the respective expansible diaphragm units 10 and 12 whereby the diaphragm turnover wheels 17 and 18 displace the expansible diaphragm units, in a predetermined manner, to complete the ply turn-up operation. Upon withdrawal of the diaphragm displacement unit 16, the stitching wheels 20 and 21 may then be vertically elevated into position, adjacent the ends of the drum, as shown in broken lines in FIG. 1. The stitcher wheels 20 and 21 may then be moved simultaneously and axially inwardly toward one another to a central position for stitching the lateral edges of the fabric plies F smoothly against the tire carcass C. Having completed the ply stitching operation, the stitching wheels are then in the solid line center position, as shown in FIG. 1, ready to perform the tread stitch-out operation to complete the tire carcass. Thereafter, the drum 1 may then be radially collapsed, the tire carcass C removed, and vulcanized in accord with conventional tire building practice.

The structure and operation of the novel tire building apparatus having been briefly described above, a detained description of the component parts and operation thereof is given hereafter.

ROTATABLE DRUM AND EXPANSIBLE DIAPHRAGM ASSEMBLY

The radial expanding tire building drum, shown generally at 1, which is adapted to support the tire carcass C (FIG. 3) includes a pair of concentrically disposed generally cone-shaped cam members 22 and 23. The outer periphery of respective cam members may be formed with cam surfaces 24 and 25 which coact in camming relation with corresponding complementary cam surfaces formed on the respective drum segments, as will be hereinafter more fully described. The respective cam members 22 and 23 may be mounted for axial movement relative to the external surface of the power quill 2 by means of vertically extending roll pins 26 secured thereto and which project through longitudinally extending slots 26a provided in the quill. The roll pins in turn may be fixably secured to an axially extending collapsing rod 27 which may be reciprocably mounted within the power quill 2.

The collapsing rod 27 as shown, may be supported for reciprocating movement within the power quill 2 at one end by a suitable fluid motor 28 and at its other end by means of an axially extending adjusting rod 29 secured thereto, and which projects through a bore 30 formed in a centering plug 31. The centering plug may be threaded as at 32 on one end and adapted to be threadably secured within one end of the power quill 2 by means of a threaded bore 33 provided on the inner surface of the quill. The centering plug 31 may be further provided at its other end with a tool engaging surface 34 to facilitate axial alignment of the collapsing rod within the power quill 2. A locking means in the form of a jam nut 35 may be threadably secured adjacent the free end of the adjusting rod 29 to maintain axial alignment of the collapsing rod 27 within the quill. Moreover, reciprocation of the collapsing rod 27 upon actuation of the fluid motor 28, imparts an axial movement to the cam members 22 and 23 relative to the external surface of the drum 1 during the tire building operation.

In the expanded condition, as shown in FIG. 3, the periphery of the drum 1 may be comprised of a plurality of annular segment supporting members 36, each of which may be adapted to slidably secure, for width-wise adjustment thereon, a pair of arcuate wing members 37 and 38. As shown, each of the respective segment supporting members 36 may be provided on their undersurface with a pair of inwardly extending cam followers 39 and 40 having complementary cam surfaces 41 and 42 which are adapted for relative camming coaction with the cam surfaces 24 and 25 provided on the respective cam members 22 and 23.

The segment supporting members 36 may be provided on their undersurface with radially inwardly extending bearing sleeves 43 and on their upper surface with axially spaced guide blocks 44 and 45. The outer surfaces of the respective segment supporting members may further be provided with a pair of oppositely disposed slots 46 and 47 extending transversely thereof and disposed inwardly of the respective guide blocks 44 and 45. The spaced slots 46 and 47 provided in each segment supporting member 36 are adapted to receive a pair of endless clamping members 48, such as coil springs or the like, which when applied around all of the respective segment supporting members, coact therewith in a manner to continuously bias the camming surfaces 41 and 42 radially inwardly relative to the cam surfaces 24 and 25 provided on the respective cam members 22 and 23.

The arcuate wing members 37 and 38 may be provided on their inner surfaces with undercut keyway slots 49 and 50 for interlockingly receiving the guide blocks 44 and 45 carried by the respective segment supporting members 36. The wing members may further be provided at their inner ends with upstanding flange portions 51 and 52 and at their outer ends with grooved portions 53 and 54 having radii sufficient to maintain a second pair of endless clamping members 55, such as coil springs or the like, therein. The clamping members 53 are adapted to be quickly snapped into position within the groove portions 53 and 54 of the wing members to continuously bias the outer ends thereof radially inwardly towards the axis of the drum, thereby aiding in locking the wing members 37 and 38 against the respective segment supporting members 36.

To provide a smooth continuous tire building surface and to vary the width of such surface, the wing members 37 and 38 are shown separated axially from one another by means of a plurality of interchangeable spacer rings 56 removably keyed to the respective segment supporting members 36. As shown in FIG. 3, the spacer rings 56 may be of a generally T-shaped configuration, in vertical cross section, having inwardly extending shoulder portions 57 which are adapted for overlapping and interlocking engagement relative to the upstanding flange portions 51 and 52 provided on their respective wing members 37 and 38. Such an overlying relation of the spacer rings 56 relative to the wing members 37 and 38, in conjunction with the biasing force of the endless clamping members 55, provides a positive interlocking of the wing members against the perspective segment supporting members 36 during the high rotational velocity of the tire building drum. Moreover, by simply interchanging the spacer rings 56 with those of a predetermined size, it is possible to axially adjust the tire building drum to accommodate the making of tires having varying widths without interrupting the smooth continuity of the tire building surface.

To further guide and steady the assembly during the radial collapsing and standing movement of the drum 1, there may be associated with each of the segment supporting members 36 a telescoping guide assembly. In a preferred form, and as shown best at FIG. 3, the guide assembly may include a generally annular hub 58 having a plurality of telescoping guide studs 59 extending radially therefrom. Toward their radially outer ends, the guide studs are adapted to be slidably received within the oppositely disposed, radially extending bearing sleeves 43 that project inwardly from the respective segment supporting members 36. Such a telescoping guide and stud arrangement provides a precision radial, collapsing and expanding of the drum during the tire building drum operation.

As illustrated in FIG. 3, the power quill 2 is shown mounting the pair of expansible diaphragm units 10 and 12 which include two oppositely disposed cylindrical spiders 60 and 61 spaced on either side of the drum 1. Each spider may be provided with a generally annular hub portions 62 and 63 fixedly secured to the power quill 1 by means of adjustable sleeves 64 and 65. Each spider is shown mounting an annular ring 66 and 67 removably secured to the peripheral edges of the spider by means of suitable set screws 69. The outer surface of each of the respective rings is preferably formed with a generally rounded shoulder portion 70 and 71 disposed beneath the marginal edges of the respective wing members 37 and 38 and generally annular body portions 72 and 73 which extend inwardly in abutting relation against the respective spiders. Such an arrangement provides generally rectangular recessed portions 76 and 77 on the outer peripheral surface of the respective spiders.

In the preferred form, the spiders 60 and 61 may be provided with annular, elastic, expansible diaphragms 78 and 79, which surround and are secured to the outer surfaces thereof. The diaphragms may be comprised of any suitable material, such as plastic, rubber, synthetic rubber, or rubberized fabric material, which is substantially impervious to the passage of air and which is sufficiently elastic to permit a controlled expansion of the respective diaphragms. It is to be noted that in the unexpanded condition, the respective diaphragms have an axial length sufficient to turn the lateral edges of the fabric plies F around the bead rings R, when the diaphragms are subsequently in an expanded condition, as shown by broken lines at FIG. 3.

Adjacent one end thereof, the respective diaphragms 78 and 79 may be provided on their undersurface with integral flange portions 80 and 81 which may be secured by means of a suitable adhesive or the like within the generally rectangular recessed portions 76 and 77 formed on the outer peripheral surface of the respective spiders. Moreover, by such an arrangement the diaphragms may be quickly interchanged and assembled as a unit on the ring members 66 and 67 which in turn may then be secured to the respective spiders, as aforementioned.

Fluid under pressure may be admitted to the space 82 between the collapsing rod 27 and the hollow power quill 2 from a suitable pump (not shown) to expand, in a predetermined manner, the respective diaphragms 78 and 79. Moreover, a fluid under pressure so admitted to the space is introduced to a pressure supply pipe 83 through an opening 84 provided in the hollow quill. A spacer ring 85 of suitable fluid sealing material, such as plastic, rubber, synthetic rubber or the like, may be secured around the collapsing rod 27 and into sealing engagement against the inner surface of the quill to by-pass the flow of fluid to the pressure supply pipe 83. The pressure supply pipe 83 may be provided at one end with a flexible conduit 86 which communicates with the diaphragm 78 and is provided at its other end with a second flexible conduit 87 which communicates with the other diaphragm 79. The flexible conduits 86 and 87 may be provided at one end with L-shaped pipe couplings 88 and 89 having flared or bell-mouth portions 90 and 91 which extend through openings 92 and 93 provided in the cylindrical spiders 60 and 61 and which extend in the tight-fitting relation through apertures 94 and 95 provided in the respective diaphragms. By such an arrangement, fluid under pressure may be quickly and efficiently introduced into the system to radially expand the diaphragms during a portion of the tire building cycle, whereupon, the diaphragm may then be quickly collapsed as desired by reversing operation of the fluid motor (not shown).

As noted, the expandable drum 1 and expansible diaphragm units 10 and 12 may be rotatably mounted in axial alignment with the housing 8 adjacent one end of the horizontally extending power quill 2. As shown, the housing 8 includes a motor housing 96 and a support housing 97, which may be made integral with the motor housing 96 to define a generally L-shaped configuration in plan form. The power quill 2 may be drivingly connected at its other end to a rotatable drive shaft 98. The driving connection between the power quill 1 and the drive shaft 98, includes an axially extending split sleeve 99 fixedly secured adjacent the end of the quill and adapted to be detachably connected to an annular flange 100 fixedly secured adjacent the end of the drive shaft 98. The drive shaft is rotatably supported at one end within a bearing 101 provided in the wall of the motor housing 96 and at its other end in a second bearing 102 secured to a supporting partition 103 within the motor housing 96.

Figure 4:
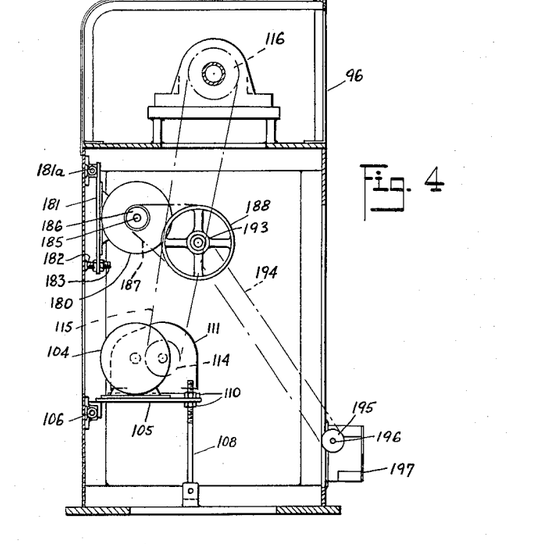
FIG. 4 is a cross-sectional view taken along line 4—4 of FIG. 1, and showing the motor assembly for actuating the novel tire building apparatus of the present invention.

Rotational movement may be imparted to the power quill 2 from a suitable electric motor 104 disposed within the motor housing 96. As shown in FIGS. 1 and 4, the electric motor 104 may be supported on a base plate 105 which may be pivotally connected at one end by means of bearing lugs 106 to a supporting bracket 107 which in turn is fixedly secured to the wall of the motor housing. The other end of the base plate 105 may be adjustably mounted on a vertically extending bearing rod 108, which in turn may be fixedly secured at its lower end to the bottom of the motor housing. The upper end of the bearing rod 108 may be provided with a threaded portion 109 adapted to receive a pair of lock nuts 110 disposed on either side of the base plate 105 to provide a vertical adjustment of the electric motor 104 mounted thereon.

As shown the electric motor 104 incorporates a speed reducer 111 connected thereto by means of a flexible coupling 112. The output shaft 113 of the speed reducer 111 may be provided with a drive pulley 114 which mounts a drive belt 115, which in turn is trained over a second pulley 116 fixedly secured to the drive shaft 98. Moreover, by vertical adjustment of the electric motor 104 via its pivotal connection to the motor housing 96, the desired amount of tension may be maintained on the drive belt 115 during the operating cycle of the drum 1.

Figure 5:
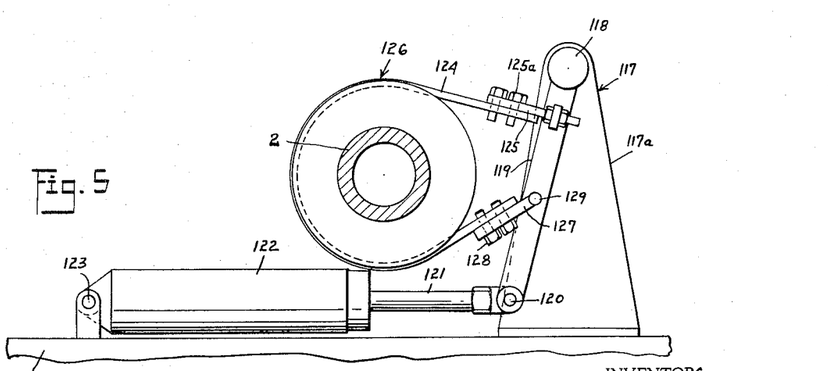
FIG. 5 is an enlarged elevational view showing the novel braking mechanism of the present invention for reducing the rotational speed of the drum removed from the assembly.

As shown in FIGS. 1 and 5, stopping of rotation of the power quill 2 may be facilitated by means of a braking unit shown generally at 117. The braking unit may include a bracket member 117a fixedly secured to the motor housing and adapted to rotatably support as at 118 one end of a brake arm 119. The other end of the brake arm 119 may be rotatably secured at 120 to the free end of a fluid actuated piston 121. The fluid cylinder 122 housing the piston 121 may be rotatably secured at one end by means of a bearing support 123 which is bolted or otherwise connected to the support housing 97. In this form, a brake band 124 in the form of a V-belt may be secured at one end to the brake arm 119 by means of a toggle plate 125 and suitable nut and bolt arrangement 125a. Brake band may be trained over a stepped pulley 126, which is preferably secured around the power quill 2 by means of suitable set screws. The other end of the brake band 125 may then be secured to a toggle plate 127 by means of U-bolts 128, the toggle plate 127 in turn being rotatably secured as at 129 to the brake arm 119. Braking force may be transmitted to the rotary power quill 2 by actuation of the fluid cylinder 122 which forces a piston 121 outwardly causing counter-clockwise rotation of the brake arm 119, as viewed in FIG. 5, with a consequent tightening of the brake band 124 around the power quill. In a like manner, retraction of the fluid piston results in loosening of the brake band which allows continued free rotational movement of the power quill.

DIAPHRAGM DISPLACEMENT ASSEMBLY

Figure 6:
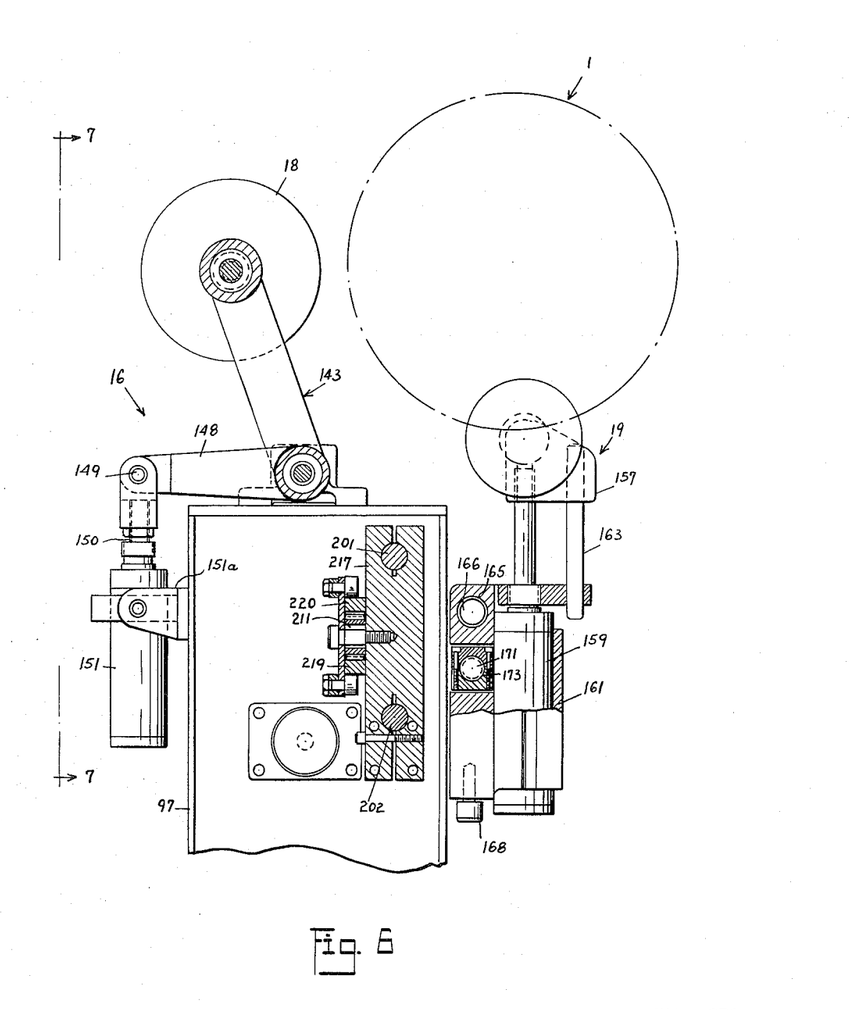
FIG. 6 is an enlarged cross-sectional view taken along line 6—6 of FIG. 1, and showing the novel diaphragm displacement and stitcher mechanisms of the present invention mounted on the housing for movement relative to said rotatable drum.
Figure 7:
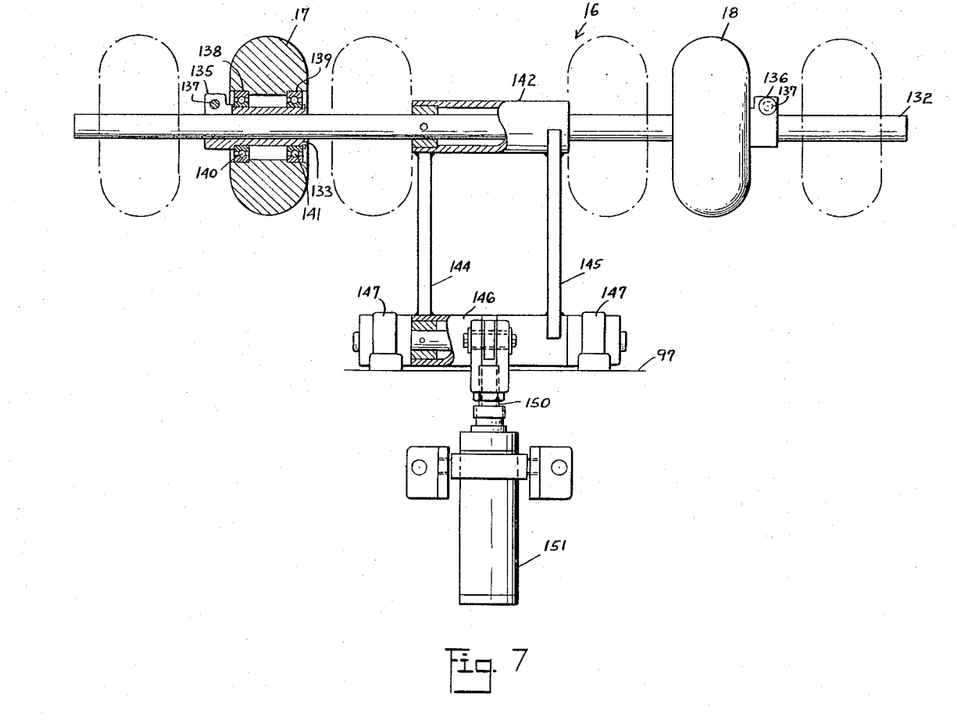
FIG. 7 is an enlarged end elevational view, with parts removed, taken from the left side of FIG. 6 and looking in the direction of the arrows along the plane of line 7—7, and showing the novel diaphragm displacement mechanism of the present invention.

As viewed in FIGS. 2, 6, and 7, the diaphragm displacement unit 16 includes a pair of oppositely disposed displacement wheels 17 and 18 rotatably journaled on a horizontally extending shaft 132. Each displacement wheel may be provided with an axially extending hub 133 formed adjacent one end thereof with an integral split sleeve 135 and 136 which may be tightened around the shaft 132 by means of a suitable set screw 137 for permitting axial adjustment of the displacement wheels, as shown in broken lines in FIG. 7. A pair of bearing races 138 and 139 may be disposed intermediate the internal surface of each displacement wheel and its split sleeve to accommodate suitable ball bearing means 140 and 141 for permitting free rotation of the displacement wheels relative to the shaft 132 upon engagement against the respective expansible diaphragm units 10 and 12.

In this form, the shaft 132 is shown fixedly mounted within an upper cylindrical sleeve 142 of a generally V-shaped bell crank 143. The bell crank 143 includes a pair of spaced arm members 144 and 145 extending diagonally downward from the upper cylindrical sleeve 143 (FIG. 6) and made integral with a second cylindrical sleeve 146 which in turn may be rotatably mounted in spaced bearing brackets 147 secured to the support housing 97. The bell crank 143 may be provided with a bell crank arm 148 which may be made integral with the sleeve 146 intermediate its ends and which extends outwardly at an angle relative to the diagonally extending arms 144 and 145. The free end of the bell crank arm 148 may be pivotally connected as at 149 to the piston 150 of a double acting fluid cylinder 151 which may be secured by means of a bracket 151a to the housing.

As shown in FIGS. 2 and 6, actuation of the fluid cylinder 151 in an upward direction causes clockwise rotation of the bell crank arm 148 to bring the spaced displacement wheels 17 and 18 into engagement against the respective expansible diaphragm units 10 and 12, whereupon, the diaphragms 78 and 79 in the expanded condition may be displaced against the lateral edges of the fabric plies F to complete the ply turn-up operation. Moreover, by a predetermined axial adjustment of the displacement wheels 17 and 18 relative to drum 1, the lateral edges of the fabric plies F may be turned over the bead rings R and in an amount sufficient to facilitate the subsequent stitching of the fabric plies F against the tire carcass C. In addition, such axial adjustment of the displacement wheels, in the manner prescribed, affords an efficient and flexible arrangement for completing the ply turn-up operation on tires of any desired width.

STITCHER ASSEMBLY

Figure 8:
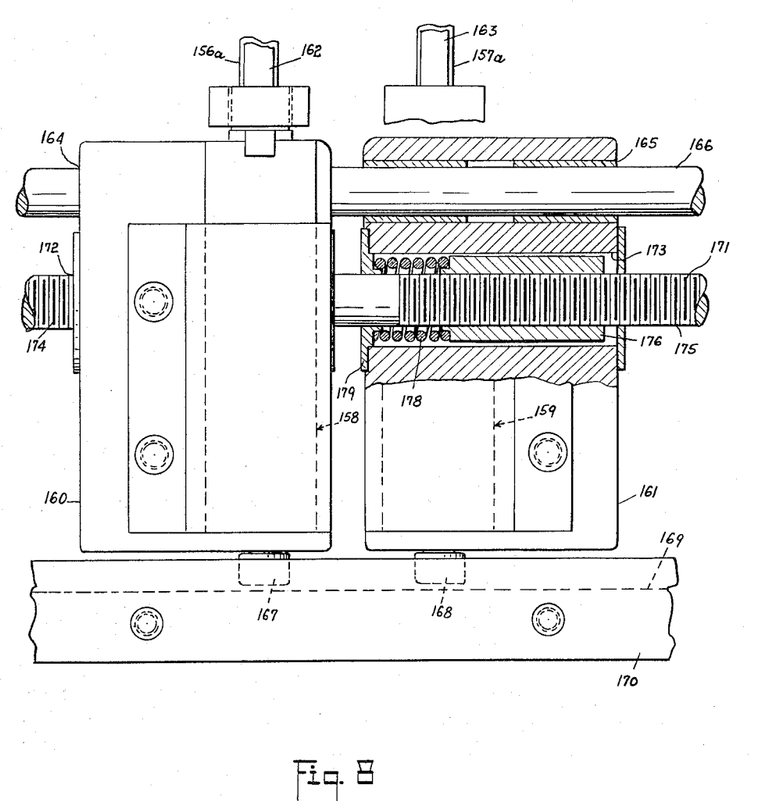
FIG. 8 is an enlarged front elevational view, with part broken away and parts in sections, and showing the novel stitcher mechanism of the present invention removed from the assembly.

As illustrated in FIGS. 1, 6, and 8, stitcher unit shown generally at 19 may include a pair of oppositely disposed stitcher wheels 20 and 21 rotatably mounted at the ends of a pair of horizontally extending stub shafts 154 and 155. The stub shafts 154 and 155 may be fixedly secured at their other ends in a pair of oppositely disposed stitcher support members 156 and 157 which in turn may be mounted for vertical movement upon a pair of fluid pistons 156a and 157a and cylinder assemblies 158 and 159. As shown, the respective fluid piston and cylinder assemblies may be vertically supported within a pair of axially movable carriage members 160 and 161. The stitcher support members 156 and 157 may be provided with vertically extending guide rods 162 and 163 adapted to be slidably received within openings provided in the respective carriage members 160 and 161. By such an arrangement, the stitcher wheels 17 and 18 may be guided and steadied into and out of stitching engagement against the fabric plies F carried by the drum 1 upon actuation of the fluid piston and cylinder assemblies.

The respective carriage members 160 and 161 may be mounted for axial movement relative to the drum 1 by means of axially aligned bores 164 and 165 provided adjacent their upper ends thereof and which are adapted to receive a horizontally extending guide rod 166 secured by means of brackets 166a to the support housing 97. Adjacent the lower ends of the respective carriage members, there may be provided guide rollers 167 and 168 fixedly secured thereto and which are adapted for relative sliding engagement within a guide channel 169 formed in a horizontally extending guide bracket 170 which in turn is secured to the support housing 97.

To impart relative axial movement to the carriage members 160 and 161 toward and away from one another, a horizontally extending drive screw 171 may be provided to extend through axial aligned bores 172 and 173 formed in the respective carriage members. The drive screw 171 may be oppositely threaded as at 174 and 175 for relative engagement with a pair of threaded nuts 176 disposed in axial alignment within the bores 172 and 173. The threaded nuts 176 may be resiliently mounted within the bores 172 and 173 by suitable biasing means 178, such as coil springs or the like, disposed around the drive screw 171 and biased against one end of the threaded nuts by means of retainer caps 179 secured to the respective carriage members. Rotation of the drive screw in one direction, therefore, serves to move the carriage members 160 and 161 and the stitcher wheels 20 and 21 carried thereby toward each other while rotation of the screw 171 in the other direction serves to move them apart.

As shown in FIGS. 1 and 4, rotation of the drive screw 171 may be provided from a second electric motor 180 disposed within the motor housing 96. In this form, the electric motor 180 may be similarly supported on a vertically extending support bracket 181 which may be pivotally connected at one end 181a to the wall of the motor housing. The other end of the support bracket 181 may be adjustably mounted on a horizontally extending bearing rod 182 fixedly secured to the housing. The bearing rod 182 may be threaded as at 183 to receive a pair of lock nuts 184 disposed on either side of the supporting bracket to provide a relative adjustment for the electric stitcher motor 180 mounted thereon.

The stitcher motor 180 incorporates an output shaft 185 on which is secured a drive pulley 186 carrying a drive belt 187 thereon. The drive belt 187 may in turn be trained over a second pulley 188 secured on a portion of a drive shaft 189 which extends exteriorly of the motor housing 96 and which is rotatably journaled as at 190 through the wall of the motor housing. The driving connection between the drive shaft 189 and the drive screw 171 incorporates a cylindrical sleeve 191 which may be fixedly secured at one end of the drive shaft 189 and removably secured around the adjacent end of the drive screw 171 by means of a shear-pin 192. The other end of the drive shaft 171 may be provided with a third pulley 193 carrying a second drive belt 194, which in turn may be trained over a fourth pulley 195 secured to the sub-shaft 196 of a rotatable limit switch 197 mounted on the housing for varying the speed of the stitcher motor 180, as will hereafter be more fully described with reference to the operational cycle of the present invention.

BEAD SETTER ASSEMBLY

Figure 9:
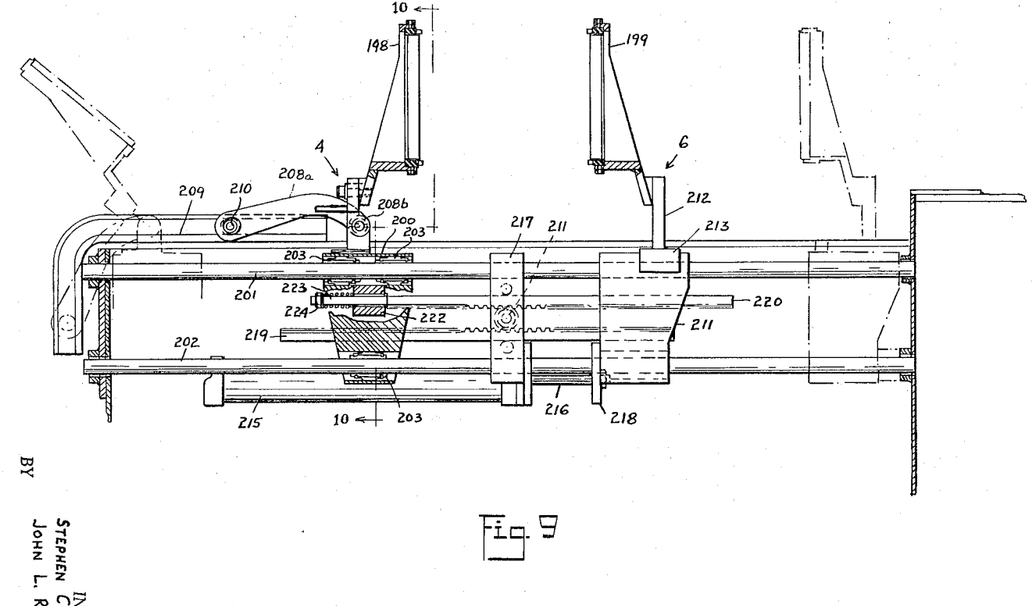
FIG. 9 is an enlarged front elevational view, with parts removed and parts in section, and showing the novel bead setting mechanism of the present invention mounted for axial movement relative to the drum.
Figure 10:
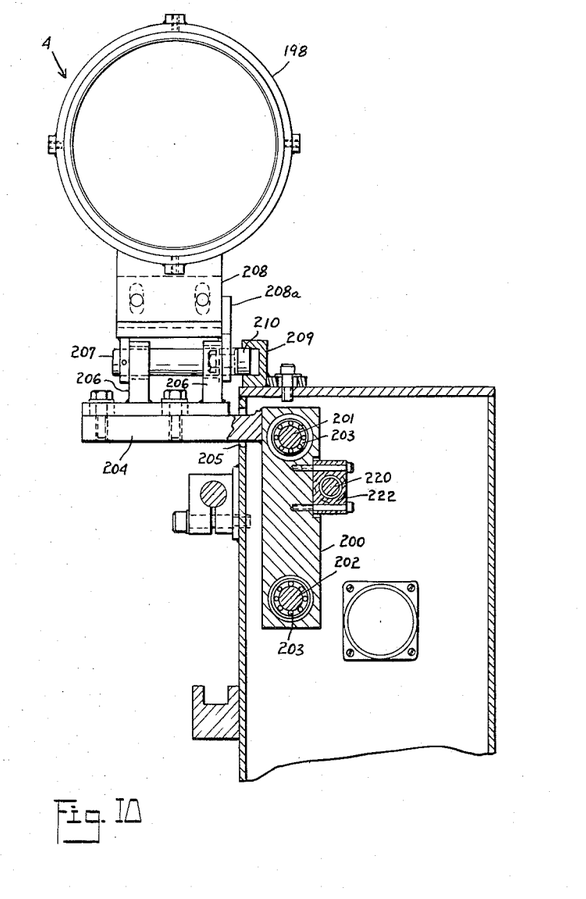
FIG. 10 is an enlarged cross-sectional view taken along line 10—10 of FIG. 9, and illustrating one of the bead setting mechanisms of the present invention.
Figure 11:
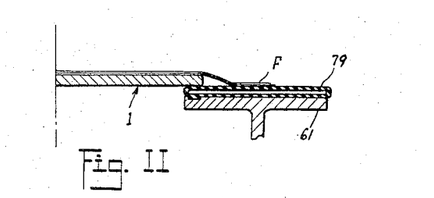
FIGS. 11 to 17 show diagrammatically the relative positions of the rotatable drum, bead setting mechanism, expansible diaphragm means, diaphragm displacement mechanism, and stitcher mechanism for performing the ply turn-up and stitching operations adjacent one end of the drum in accord with the principles of the present invention.
Figure 12:
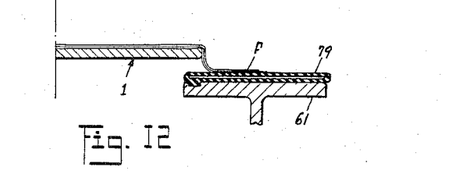

The bead setter units 4 and 6, as shown in FIGS. 1, 9 and 10, include a pair of cylindrical bead holders 198 and 199 concentrically disposed relative to the power quill 2 and adapted for axial movement toward and away from one another over the expansible diaphragm units 10 and 12 to position the inextensible bead rings R on the shoulder portions of the expandable drum 1. The bead holder 198 may be pivotally supported on a carriage member 200 which in turn is mounted for axial sliding movement within the housing on horizontally extending guide rods 201 and 202 by means of ball bearings 203.

The pivotal connection between the internally mounted carriage member 200 and the cylindrical bead holder 198, includes a horizontally extending carriage plate 204 fixedly secured adjacent one end of the carriage member 200 and extending exteriorly of the support housing 97 towards its other end through a longitudinally extending slot 205 provided in the wall of the housing. The carriage plate 204 mounts a pair of spaced bearing brackets 206 extending exteriorly of the housing which rotatably journals a horizontally extending shaft 207 therein. A bead setter bracket 208 may be fixedly secured at one end of the cylindrical bead holder 198 and at its other end to the shaft 207, such that the bead holder 198 may be pivotally mounted upon rotation of the shaft.

Pivotal movement may be imparted to the bead holder 198 by means of a toggle arm 208a fixedly secured at one end 208b to the shaft 207 and slidably received at its other end within a cam track 209 mounted on the support housing 96 by means of a cam follower 210 attached thereto and adapted for camming coaction within the cam track 209. In this form, the cam track 209 may be of a generally L-shaped configuration, in elevation, such that after a predetermined axial movement of the bead setter unit 4 outwardly away from the drum 1, the cylindrical bead holder 198 may be pivoted downwardly and outwardly into an inoperative position, as shown by the broken lines at FIGS. 1 and 9.

The bead setter unit 6 may be similarly mounted adjacent the other end of the drum 1 for axial movement on a movable carriage member 211 which is supported on the horizontally extending guide rods 201 and 202 by means of ball bearings, not shown. In this form, a non-pivotal connection may be provided between the cylindrical bead holder 199 and the carriage member 211 which includes a bead setter bracket 212 fixedly secured at one end to the cylindrical bead holder 199 and at its other end to a horizontally extending carriage plate 213 which extends through a longitudinal slot 214 provided in the support housing 97 (FIG. 1). The carriage plate 213 may be in turn fixedly secured to the carriage member 211 which is slidably mounted within the housing, as noted, whereby the bead setter unit 6 may be moved axially away from the drum 1 to an inoperative position, as shown by the broken lines at FIGS. 1 and 9.

Axial movement of the respective bead setter units 4 and 6 toward and away from each other to position the bead rings R on the drum 1 may be accomplished by means of a fluid cylinder 215 and piston 216 assembly mounted within the support housing 97. The fluid cylinder 215 may be fixedly secured at one end to the housing and at its other end to a pinion support bracket 217 that in turn may be fixedly secured to the horizontally extending guide rods 201 and 202 which slidably support the respective carriage members. The free end of the piston 216 may be detachably connected to the carriage member 211 by means of an anchor plate 218 mounted on the carriage member. A lower horizontally extending rack member 219 may be fixedly secured at one end to the carriage member 211 and adapted for relative coaction with an upper horizontally extending rack member 220 provided on the other carriage member 200 by means of a pinion gear 221 rotatably mounted on the support bracket 217 intermediate the rack members. As shown, the upper rack member 220 may be resiliently mounted at one end with a rack bracket 222 which is secured to the carriage member by suitable biasing means 223, such as coil springs or the like, disposed around the end of the rack member and adapted to be resiliently biased against the rack bracket 222 by suitable nut means 224 threadably received on the end of the rack member. Actuation of the cylinder 215, therefore, serves to move the carriage 211 and rack 219 axially to the right, as viewed in FIG. 9, causing rotation of the pinion gear 221 in a counterclockwise direction which in turn serves to simultaneously move the rack 220 and carriage 200 axially to the left. Conversely, actuation of the cylinder in the opposite direction serves to rotate the pinion gear in a clockwise direction causing the respective bead setter units 4 and 6 to move simultaneously inwardly toward one another to perform the bead setting operation.

CONTROL SYSTEM AND OPERATION

Figure 16:
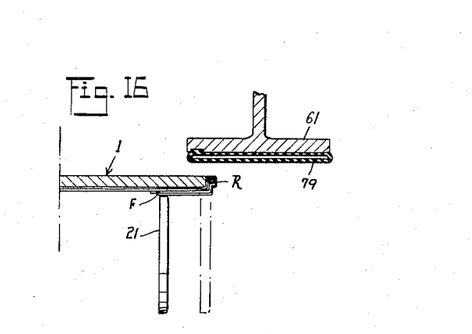
Figure 17:
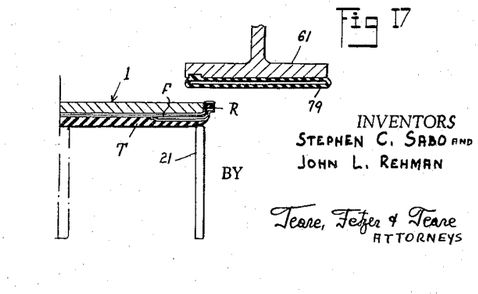
Figure 18:
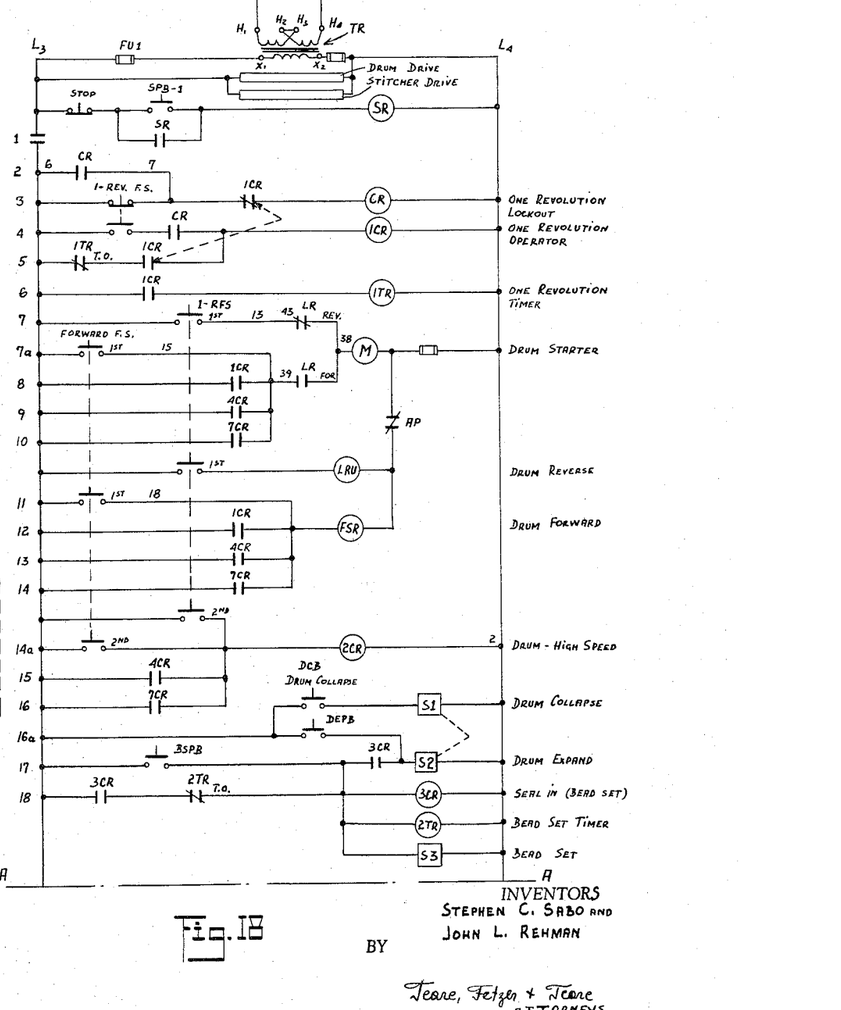
Figure 18A:
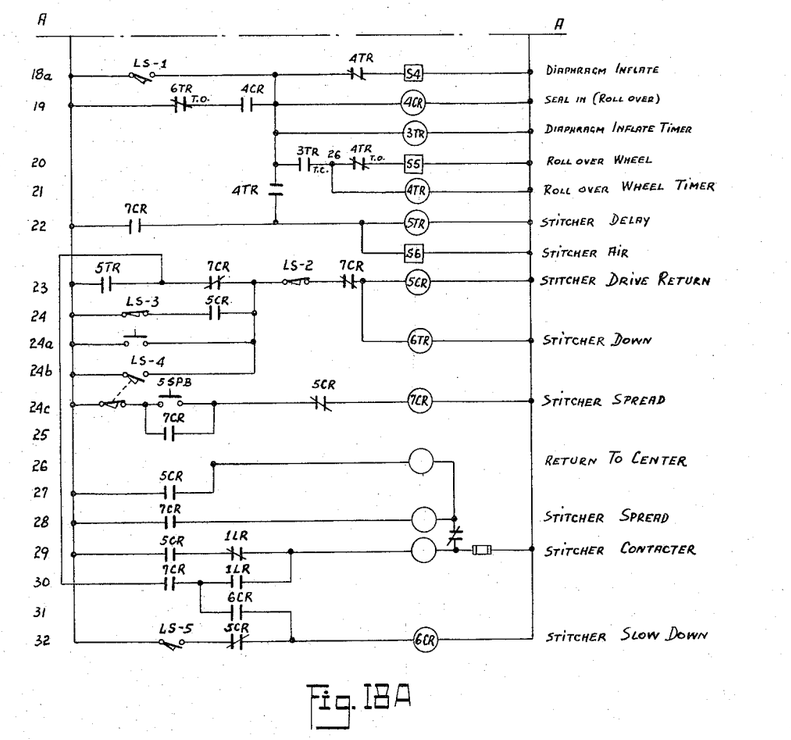
Figure 19:
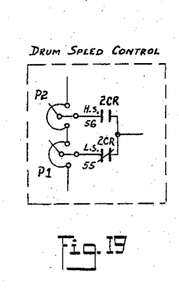
Figure 20:
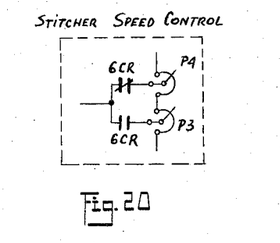

Referring now more particularly to FIGS. 11 to 17, there is shown a preferred sequential and diagrammatic representation for fabricating tires in accordance with the principles of the present invention and a schematic electric control system for the above described apparatus, as shown in FIGS. 18 through 20. The electrical system as shown, includes a two-wire 440 volt or 220 volt power circuit L1, L2, and a two-wire control circuit L3, and L4. The two-wire L3, L4 control circuit derives its electrical energy from the two-wire power circuit by means of a control transformer TR which acts to step the voltage of the circuit down to 110 volts. In cases where 110 volts single phase source is available the transformer TR would not be required in the circuit. The electric lines of FIGS. 18 and 18A have been consecutively numbered to the left of the drawings thereof to facilitate location and identification of the various components, whereas, the function of the various components, in the respective lines, have been indicated to the right of the drawings.

Prior to the commencement of the operational cycle, the bead setting mechanisms 4 and 6 are in their outermost position (broken line) with the stitcher wheels 20 and 21 of the stitcher unit 19 being disposed beneath and adjacent the ends of the drum 1 (broken line), as shown in FIG. 1. The operator may initially energize the control circuit by depressing the start push button SPB-1, and by energizing the SR control relay which maintains itself through its SR contact in line 1. The first fabric ply is preferably run on the drum 1 at a slow speed (50 r.p.m. to 60 r.p.m.), with the drum rotating in the direction of the operator by depressing the one revolution foot switch 1–REV.FS (lines 3, and 4 of FIG. 18, and 230 of FIG. 1) which energizes the CR control relay and the normally closed 1–CR contact in line 3 to close the normally open CR contact in line 4. Upon depressing the one revolution foot switch 1–REV.FS, the 1–CR control relay in line 4 is energized and maintains itself through its 1–CR contact in line 5. The 1–CR contact in line 6 then energizes the one-revolution timer 1–TR in line 6 which has been set at a time sufficient to allow the first fabric ply to be applied to the drum. Thus, after a pre-set time interval, the normally closed one-revolution time contact 1–TR in line 5 opens and de-energizes the maintaining circuit of the 1–CR control relay in line 4. Another normally open 1–CR contact in line 8 closes and energizes the drum starter M in line 7a, which actuates the electric drum motor 104 (FIG. 1) and which allows the drum 1 to rotate for as long as the 1–CR contact in line 8 remains closed. Another normally closed 1–CR contact in line 12 is energized to actuate the forward switch relay FSR for causing the top of the drum 1 to rotate toward the operator. Thus, after applying the first fabric ply to the drum, a second or any number of subsequent plies may be similarly applied to the drum, as desired, by again depressing the one-revolution foot switch 1–RFS, in each case, to repeat the sequential operation.

Upon applying the desired number of fabric plies to the drum, the operator may then manually expand the drum (FIG. 12) by depressing the drum expand push-button DEPB in line 16a which energizes solenoid 2 in line 17. Energization of the solenoid 2 actuates the fluid motor 28 (FIG. 1) for causing axial reciprocation of the collapsing rod 27 and a camming coaction between the cam members 22 and 23 and the respective drum segments for radially expanding the drum. However, in another form when it is not desired to manually expand the drum, the operator may then directly commence the bead setting operation.

Figure 13:
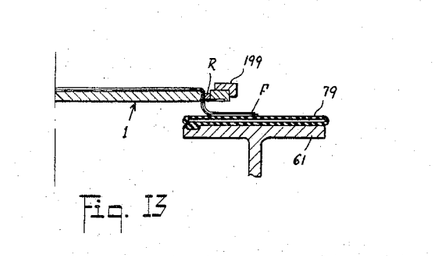

Depressing the bead-set push button BSPB in line 17, energizes control relay 3–CR in line 18 and closes the normally open 3–CR contact in line 17 to energize the drum expand solenoid 2. The bead-set push button BSPB also energizes timer control relay 2–TR in line 18 and solenoid 3, which allows fluid under pressure to be admitted to the fluid cylinder 215 (FIG. 8) for moving the bead ring holders 198 and 199 axially toward each other. The operator continues to press the bead-set push button BSPB until the bead rings R are supported on the drum and over the fabric plies F and at which time the drum has achieved its fully expanded condition, as shown in FIG. 13. The amount of time that the bead holders 198 and 199 are in engagement with the drum, is determined by the 2–TR timer control whose normally closed 2–TR contact in line 18 will be energized to open after a pre-set time. (The timer control relay 2–TR may preferably be set with an adjustable range of approximately 1 to 5 seconds.) Upon expiration of the pre-set time, the 2–TR contact in line 18 will then open to de-energize control relays 2–CR, 3–CR, and solenoid 3. De-energization of solenoid 3 causes retraction of the fluid cylinder 215 (FIG. 9) for moving the bead holders 198 and 199 axially away from one another and out of engagement with the drum. As the bead holders 198 and 199 are moving away from one another, and into an inoperative position, limit switch LS–1 in line 18a is tripped to close its contact which energizes control relay 4–CR and its contact 4–CR in line 19.

Figure 14:
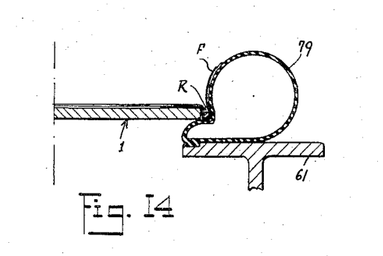

Simultaneously, with the energization of control relay 4–CR, the solenoid 4 in line 18 and the 3–TR timer relay are energized to admit fluid under pressure to the conduits 86 and 87 for expanding the expansible diaphragms 78 and 79. As shown in FIG. 14, upon expanding of the respective diaphragms, the fabric plies F are initially turned up around the bead rings R which surmount the tire carcass C. The 3–TR timer relay (which may be preferably set with an adjustable range of 1 to 5 seconds) governs the time required for the diaphragms to expand and under a pressure between about 10 p.s.i. to 20 p.s.i. which is sufficient to commence the ply turn-up operation. Upon elapsing of the pre-set time, the 3–TR contact in line 20 closes and energizes solenoid 5 in line 20 and the 4–TR timer control relay in line 21 to complete the initial stage of the ply turn-up operation.

Figure 15:
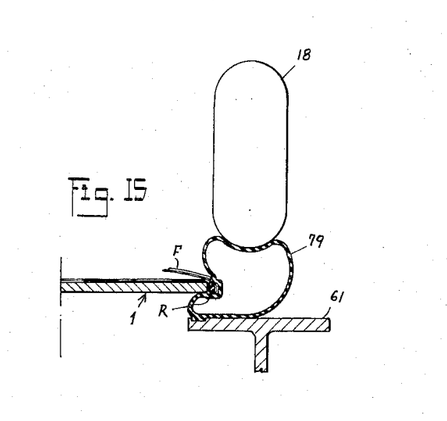

Energization of solenoid 5 admits fluid under pressure to the cylinder 151 of the diaphragm displacement unit 16 (FIGS. 2 and 6) to bring the diaphragm displacement wheels 17 and 18 into engagement against the respective diaphragms. As shown in FIG. 15, as the diaphragm displacement wheels are brought into engagement against the diaphragm, the latter becomes uniformly displaced to turn the lateral edges of the fabric plies F around the respective bead rings R. By such uniform displacement of the diaphragms against the fabric plies F, it is insured that no air will be entrapped between the lateral edges of the plies and the main portion of the tire carcass, and that the lateral edges of the ply will be turned over the bead rings R substantially free of wrinkles. The amount of time the turn-over wheels 17 and 18 are against the respective diaphragms is determined by the 4–TR timer relay, which may be preferably pre-set within an adjustable range of 1 to 5 seconds. The extent and manner by which the expansible diaphragms 78 and 79 are displaced by the wheels, and the duration of time of such displacement are important and upon the accuracy of the same depends the degree of precision with which the fabric plies F are turned over the extensible bead rings R. There must be achieved a precise synchronization between the initial expanding of the diaphragms and the subsequent displacement of the same against the fabric plies to accurately assure (not only) the desired degree of perfection in the ply turn-up operation. Upon the lapsing of the pre-set time, the normally closed 4–TR contact in line 20 is opened to energize solenoid 5 in line 20, thereby retracting fluid cylinder 151 for pivoting the diaphragm displacement unit 16 into an inoperative position and out of engagement with the respective diaphragms 78 and 79. Another 4–TR timer contact in line 21 then closes and energizes solenoid 6 and 5–TR relay to commence the ply stitch in operation.

Energization of solenoid 6 admits fluid under pressure to cylinders 158 and 159 (FIG. 9) for causing the stitcher wheels 20 and 21 of the stitcher mechanism 19 to move into engagement against the ends of the drum. As shown in FIG. 16, the stitcher wheels are held in engagement against the lateral edges of the fabric plies F adjacent the ends of the drum for a short interval of time, preferably for one complete revolution of the drum, by means of the 5–TR timer contact in line 23. In this manner, the stitcher wheels 20 and 21 will dwell for a short period of time adjacent the ends of the drum to thereby prevent any spiral effect which may result from rotation of the drum at the commencement of the ply stitching operation. After such a pre-set time delay, the 5–CR control relay and its 5–CR contacts in lines 27 and 29 are energized to actuate the electric stitcher motor 180 (FIG. 1), which moves the stitcher wheels 20 and 21 by means of the oppositely threaded drive screw 171 axially inwardly toward one another to smoothly and uniformly stitch the fabric plies F against the tire carcass. The stitcher wheels 20 and 21 continue to move axially toward the center of the drum, as shown in solid lines at FIG. 1, until the 6–TR timer relay in line 24a times out, which is preferably pre-set for about 5 to 10 revolutions of the drum. Upon elapsing of such pre-set timer, the normally closed 6–TR contact in line 19 opens and de-energizes all of the previous relays and timers causing the stitcher motor 180 to stop rotation and the fluid cylinders 158 and 159 to be retracted for dropping the stitcher wheels 20 and 21 out of engagement with the drum. However, during such de-energization, the stitcher wheels 20 and 21 continue to move toward the center of the drum by means of 5–CR control relay and its 5-CR contact in line 24 which remains energized by means of the limit switch LS-3 in line 24. When the stitcher wheels reach the center of the drum the normally closed limit switch LS-2 in line 23 is opened to de-energize the 5-CR control relay which then stops further axially movement of the stitcher wheels which then come to rest opposite the center of the drum.

With the stitcher wheels 20 and 21 centered, the tire carcass C is then ready to receive the tire tread T (FIG. 17). The tire tread T may be taken from a conventional tread tray (not shown) and fed by the operator onto the drum 1 at a slow speed by again depressing the one revolution foot switch 1-RFS in line 7. After the tread is applied to the drum, the operator may then depress the stitcher start push button SSPB in line 24c, which energizes the 7-CR control relay in line 24c and its corresponding 7-CR contacts in lines 10, 14, 28 and 30 for actuating the electric drum motor 104 (FIG. 1) thereby causing the top of the drum to rotate at a high speed in the direction of the operator. At such time, the normally open 7-CR contact in line 21 closes to energize solenoid 6 and the 5-TR timer relay in line 22 to again admit fluid under pressure to cylinders 158 and 159 for raising the stitcher wheels 20 and 21 into engagement against the drum, as shown in FIG. 17. After a pre-set time delay, sufficient to allow the drum to make one complete revolution, the 5-TR contact in line 23 closes, whereupon, the stitcher wheels 20 and 21 commence to move at a relatively high speed axially apart toward the ends of the drum for stitching the tread T smoothly against the tire carcass C. The stitcher wheels continue movement along the tread until the limit switch LS-5 in line 32 is tripped to energize the 6-CR control relay in line 32 and its 6-CR contact in line 31, which acts to reduce the stitching movement from a high to a relatively low speed. Moreover, as the tread is generally wider than the width of the drum, such slowing down of the stitcher wheels 20 and 21 allows the tread to be slowly stitched over the outer shoulders of the drum adjacent its ends thereof. The stitcher wheels 20 and 21 continue to slowly stitch-out along the tread until the limit switch LS-4 in line 24b is tripped to de-energize the 7-CR control relay in line 27c, which stops further outward movement of the stitcher wheels. Closing of the limit switch LS-4 energizes the 5-CR control relay in line 23, which again starts the return movement of the stitcher wheels 20 and 21 towards the center of the drum. The stitcher wheels continue to move toward the center of the drum until the limit switch LS-3 in line 24 is tripped which then stops further inward movement of the stitcher wheels. In this position, the 7-CR contact of control relay in line 24c is de-energized to stop further rotation of the drum and to retract the fluid cylinders 158 and 159 for dropping the stitcher wheels 20 and 21 into their initial starting position adjacent the ends of the drum, as shown in broken lines in FIG. 1. Having completed the tread stitching operation, the operator may then depress the drum collapse button DCB in line 16 which energizes solenoid 1 and the electric motor 28 (FIG. 1) for collapsing the drum to its minimum diameter. The tire carcass C with the tread T adhered thereto may then be removed from the drum and vulcanized to form the finished tire in the conventional manner.

The relative rotational speeds of the electric drum 104 and stitcher motor 180 of FIG. 1, may be accomplished by means of a variable potentiometer arrangement, as shown in FIGS. 19 and 20. As applied to the drum motor 104, the 2-CR control relay in line 14a is normally de-energized to allow the drum to rotate at a low speed as determined by the potentiometer P-1. When the 2-CR control relay is energized, as noted, during the operational sequence, the highest speed is predetermined by relative adjustment of the potentiometer P-2 of FIG. 19. Similarly, the energization of the 6-CR control relay in line 32 selects pre-set speeds of the stitcher motor 180, as determined by the potentiometers P-3 and P-4 of FIG. 20.

From the foregoing discussion and drawings, it will be seen that the present invention provides a novel tire building apparatus for automatically building vehicle tires. It will also be seen that the present invention provides an apparatus that incorporates a novel bead setting mechanism that may be automatically controlled for precisely positioning inextensible bead rings adjacent the ends of an expansible drum.

The invention also provides novel expansible diaphragm and diaphragm displacement mechanisms which are automatically synchronized for smoothly and uniformly turning the fabric plies about the inextensible bead rings. The invention further provides a novel stitcher mechanism for automatically stitching the fabric plies about the inextensible bead rings upon the completion of the ply turn-up operation, and then automatically performs the tread stitching operation to provide a completed tire carcass which may then be vulcanized in a conventional manner.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

We claim:
1. A tire building apparatus comprising:
a frame,
a cylindrical drum rotatably supported on said frame and adapted to mount a plurality of fabric plies having an inextensible bead portion incorporated therewith,
means for rotating said drum,
expansible means axially disposed adjacent at least one end of said drum for turning the lateral edges of said fabric plies around said bead portion thereof,
rotatable means pivotally mounted on said frame for movement in a generally vertical plane and adapted to displace said expansible means against the lateral edges of said fabric plies for continuing to turn the lateral edges of said fabric plies around said bead portion thereof,
bead setting means supported on said frame for axial movement relative to said drum and adapted to position said inextensible bead portion over said fabric plies adjacent at least one end of said drum thereof,
said bead setting means including,
a horizontally extending support means,
a pair of carriage members reciprocably mounted on said support means, and
a pair of cylindrical bead holders, each of said bead holders being mounted on one of said carriage members and adapted to support an inextensible bead ring thereof,
fluid pressure means drivingly connected to one of said carriage members,
a first rack member attached to said one carriage member,
a second rack member connected to the other of said carriage members, and
pinion means coacting between said rack members for axially moving said carriage members toward and away from each other upon actuation of said fluid pressure means.
2. A tire building apparatus according to claim 1, including:
a time control means for automatically determining the length of time the cylindrical bead holders are in engagement adjacent the end of said drum.
3. A tire building apparatus according to claim 1, wherein one of said cylindrical bead holders includes:

a pivotal connection to one of said carriage members for movement into an inoperative position upon actuation of said fluid pressure means.

4. A tire building apparatus according to claim 3, wherein said pivotal connection includes:
  a cam track mounted on said frame, and
  cam follower means on said cylindrical bead holder and adapted for camming coaction with said cam track.

5. A tire building apparatus comprising:
  a frame,
  a collapsible drum rotatably supported on said frame and adapted to mount a plurality of fabric plies having an inextensible bead portion incorporated therewith,
  means for rotating said drum,
  expansible means axially disposed adjacent at least one end of said drum for turning the lateral edges of said fabric plies around said bead portion thereof,
  displacement means pivotally mounted on said frame for movement in a generally vertical plane and adapted to displace said expansible means against the lateral edges of said fabric plies for continuing to turn the lateral edges of said fabric plies around said bead portion thereof,
  bead setting means supported on said frame for axial movement relative to said drum and adapted to position said inextensible bead portion over said fabric plies adjacent one end of said drum,
  stitching means mounted for axial movement on said frame and adapted to stitch the lateral edges of said fabric plies about said inextensible bead portion and for stitching a tire tread portion against said fabric plies,
  said stitching means including,
  horizontally extending support means attached to said frame, a pair of carriage members mounted for axial movement toward and away from each other on said support means,
  a pair of cylindrical stitcher wheels, each of said stitcher wheels being mounted on one of said carriage members and adapted for stitching engagement relative to said fabric plies, and
  fluid pressure means mounted on each of said carriage members and coacting with said stitcher wheels for vertically moving said stitcher wheels into and out of stitching engagement relative to said fabric plies,
  threaded means rotatably associated with each of said carriage members,
  motor means drivingly connected to said threaded means for axially moving said stitcher wheels toward and away from each other,
  time control means,
  means controlled by said time control means for admitting fluid under pressure to said fluid pressure means for vertically moving said stitcher wheels into and out of stitching engagement relative to said drum,
  other time control means, and
  means controlled by said other time control means for actuating said motor means to thereby control axial movement of said stitcher wheels relative to said drum.

References Cited by the Examiner
UNITED STATES PATENTS

| | | | |
|---|---|---|---|
| 2,565,071 | 8/1951 | Frazier | 156—401 |
| 2,604,420 | 7/1952 | Barber | 156—409 |
| 2,642,921 | 6/1953 | Appleby | 156—409 |
| 2,717,628 | 9/1955 | Wikle et al. | 156—401 |
| 3,078,204 | 2/1963 | Appleby | 156—401 |

ALEXANDER WYMAN, *Primary Examiner.*

HAROLD ANSHER, *Examiner.*